United States Patent [19]
Rusk

[11] 3,803,902
[45] Apr. 16, 1974

[54] TIMING APPARATUS
[75] Inventor: Earl E. Rusk, Freeport, Tex.
[73] Assignee: The Dow Chemical Company, Midland, Mich.
[22] Filed: Oct. 12, 1971
[21] Appl. No.: 187,995

[52] U.S. Cl. ................................................ 73/56
[51] Int. Cl. .......................................... G01n 11/06
[58] Field of Search ........... 73/56, 57; 58/39.5, 144; 250/231 SE

[56] References Cited
UNITED STATES PATENTS
3,625,050 12/1971 Noetzel et al. ........................ 73/56
3,242,720 3/1966 Zavasnik .............................. 73/56
3,360,986 1/1968 Rothschild ........................... 73/56
FOREIGN PATENTS OR APPLICATIONS
442,808 1/1968 Switzerland ........................ 73/56

Primary Examiner—Jerry W. Myracle
Assistant Examiner—Joseph W. Roskos
Attorney, Agent, or Firm—Earl D. Ayers

[57] ABSTRACT

This invention comprises apparatus for measuring the rate of extrusion of an olefin plastic or material having similar extrusion characteristics through an orifice of specified length and diameter under prescribed conditions of temperature and pressure. A follower arm sensing motion of a piston rotates an apertured disc between a light source and photocell coupled to a timer device. The timer is actuated during the time the aperture permits light to pass between the source and photocell. Aperture movement is a function of the movement of a piston in a standardized test setup.

5 Claims, 3 Drawing Figures

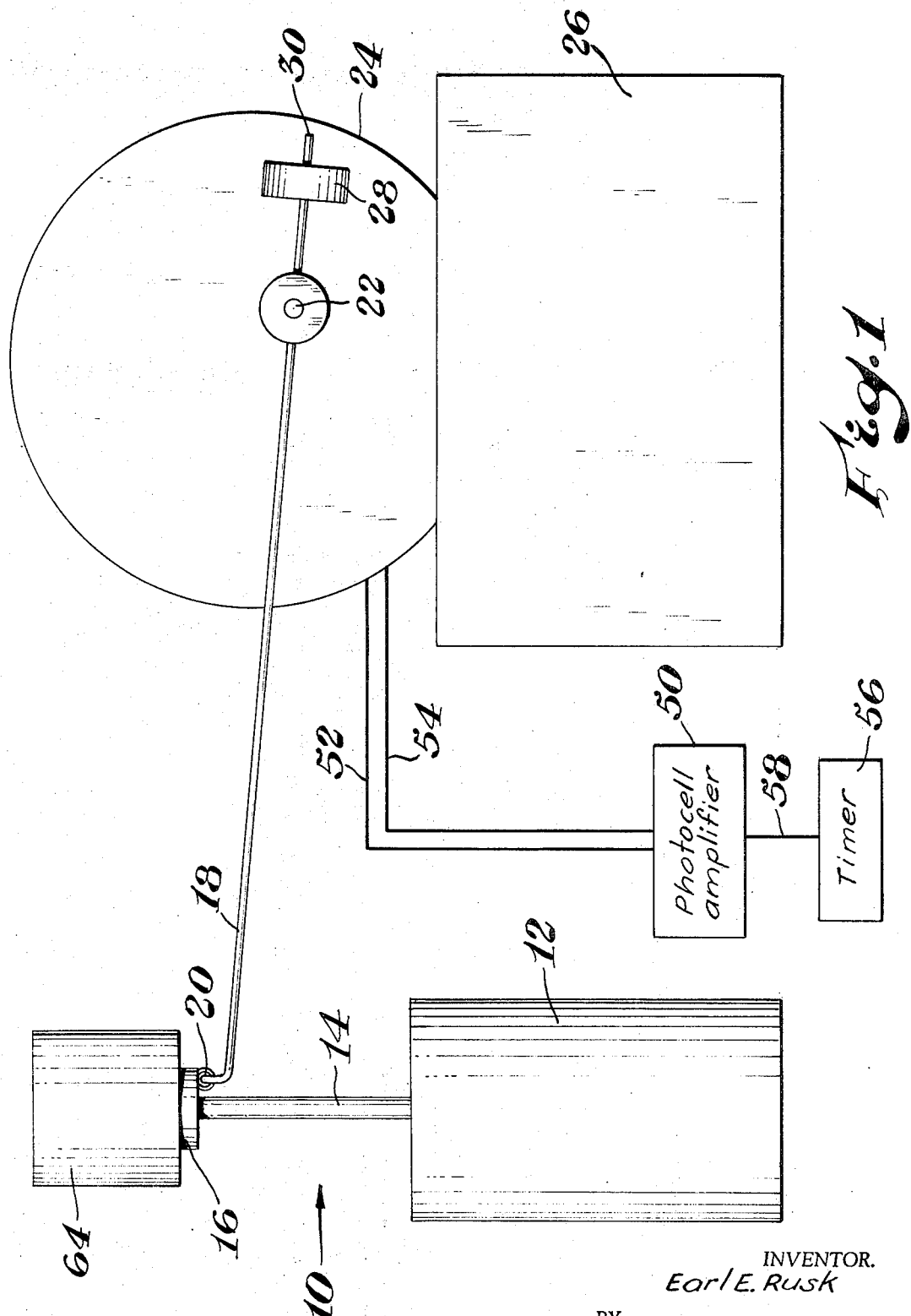

INVENTOR.
Earl E. Rusk
BY
Earl D. Ayers
AGENT

TIMING APPARATUS

BACKGROUND OF THE INVENTION

This invention relates to apparatus for measuring the rate of extrusion of extrudable materials, particularly materials such as olefin plastic material.

Melt index is a property description used in the manufacture, sales and use of polyethylene and other plastics.

A standard melt index test according to an American Society of Testing Materials procedure, determines the weight of a polymer, at a controlled temperature, that flows through an orifice in a given length of time under a constant pressure. A temperature of 190° C. and a load of 2,160 grams on a piston having a diameter of 0.373±0.0003 inch is used for standard polypropylene melt index tests. The orifice through which the polymer passes is 0.315±0.001 inch long and 0.0825±0.0002 inch in diameter.

These conditions result in the polymer melt being subjected to a force of 43.25 pounds per square inch. The flow rate of course depends upon the melt index of the material and for polypropylene (density 0.91) will vary between 0.01 cc./min. for melt index 0.1, and 1.133 cc./min. for melt index 10.0. The corresponding shear rate range is from 0.204 sec.$^{-1}$ to 20.4 sec.$^{-1}$ for the 0.0825 inch orifice.

The material passing through the orifice in such tests must be weighed and the time also accurately determined, each test requiring substantial attention by the technician making the test.

OBJECTS OF THE INVENTION

Accordingly, a principal object of this invention is to provide improved apparatus for making melt index tests.

Another object of this invention is to provide improved apparatus, requiring less attention by a technician, for determining the melt index of a plastic material.

STATEMENT OF INVENTION

In accordance with this invention, a follower arm is coupled to the weighted piston entering the melt indexer barrel so that the follower arm comes in contact with the shoulder supporting the weight on the piston. The follower arm's downward motion rotates an aperture disc mounted on as shaft which is coupled perpendicularly to the follower arm. The aperture disc rotates between a light source and a photocell detector. The aperture disc has two holes each of different diameters drilled through the disc. As the disc is rotated around, a hole passes between the light and the detector, allowing light to strike the photocell. The output of the photocell is fed into an amplifier which energizes a relay, starting a timer readout. As the aperture disc rotates farther around, the light beam is cut off and stops the timer. The diameter of the hole plus the length of the follower arm determines the measured stroke of the piston. The timer readout is used to determine the time required for the piston to travel a pre-selected distance. Two different diameter holes are used. One to give ¼ inch travel of the piston, the other for 1 inch travel. The aperture disc is held in place by a friction clutch. Selection of stroke is accomplished by manual rotation of the aperture disc to the desired indexed starting point.

The invention, as well as additional objects and advantages thereof, will best be understood when the following detailed description is read in connection with the accompanying drawings, in which:

FIG. 1 is a side elevational and diagrammatical view of apparatus in accordance with this invention;

DETAILED DESCRIPTION OF THE DRAWING

Figure 3:
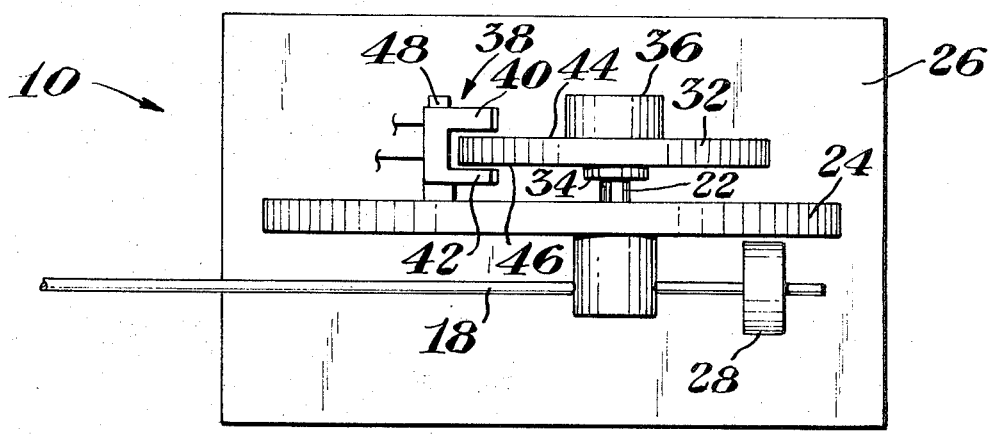
FIG. 3 is a plan view of the apparatus shown in FIG. 1.

Referring to the drawings, there is shown melt index measuring apparatus, indicated generally by the numeral 10, including a melt indexer barrel 12, a piston 14 having an outwardly extending shoulder 16 at or near its upper end, and a weight 64 carried by said piston 14. A follower arm 18 whose outer end 20 bears against the lower surface of the shoulder 16 is longitudinally slidably coupled to a transversely disposed shaft 22 which extends through a bore in an upright plate 24 which is mounted on a transversely disposed base member 26. A positionally adjustable counter weight 28 is carried near the end 30 of the follower arm 18.

Figure 2:
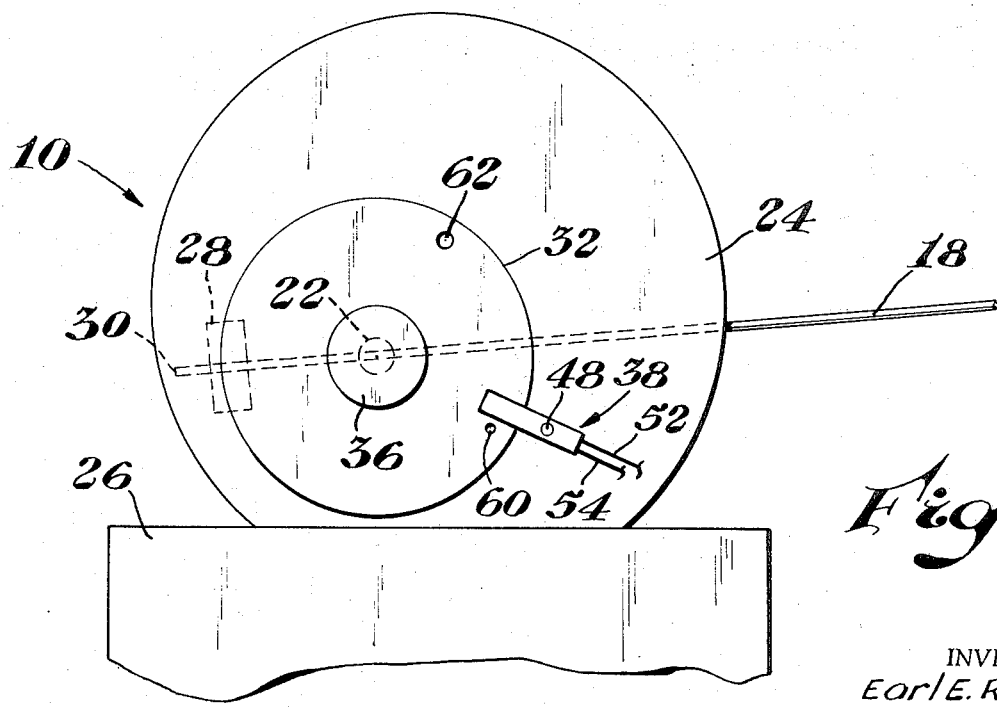
FIG. 2 is a fragmentary elevational view taken from the rear of the apparatus shown in FIG. 1.

Referring especially to FIGS. 2 and 3, a disc 32 is carried on the shaft 22 between the stop nut 34 and friction clutch unit 36 whereby the disc rotates with upward or downward movement of the follower arm 18. The friction clutch unit 36 is adjusted to permit manual rotation of the disc 32 on the shaft 22 while holding the follower arm 18 in fixed position.

A light source photocell detector unit, indicated generally by the numeral 38, is coupled to the plate 24 and has arms 40, 42 extending over the side part 44, 46 respectively, of the disc 32. One arm contains a light source (not shown) directed at the disc 32 while the other arm contains a photocell light detector (not shown) positioned and adapted to receive light from the light source in the other arm of the unit 38.

The detector unit is secured to the plate 24 by means of a bolt assembly 48, for example. The light source and photocell detector are coupled to a photocell amplifier 50 by means of cables 52, 54. The output of the amplifier 50 is coupled to a timer device 56 through cable 58.

The disc 32 has a pair of bores 60, 62 extending therethrough in alignment with the light source and the photocell detector of the unit 38. The diameter of the bores 60, 62 is proportional to the amount of movement of the follower arm needed to be measured.

OPERATION OF THE APPARATUS

In operation the material (usually a plastic material) whose melt index is to be determined is inserted into the melt indexer barrel 12 where it is heated to the temperature called for in making the melt index determination. The barrel 12 has an orifice (not shown) through which plastic is exuded under pressure from the piston 14 which has a weight 64 of predetermined mass bearing thereon.

The counterweight 28 is positionally adjusted so that the end 20 of the follower arm 18 bears against the lower surface of the shoulder 16 with a force of about 5 grams.

The disc 32 is rotated so that, with the end 20 of the follower arm 18 contacting the lower surface of the shoulder 16, one of the bores 60 or 62 is adjacent to the light source detector unit 38. Thus, assuming that the barrel 12 is heated to the temperature called for in making the melt index test, the weight on the piston forces the piston 14 and the follower arm 18 downwardly.

As the bore 60 (or 62) comes between the light source and detector arms 40,42 of the unit 38, the photo-detector "sees" light, its output signal is amplified by the amplifier 50 whose output in turn energizes the timer 56. The timer continues running as long as the position of the bore 60 (or 62) permits the passage of light from the light source to pass through the disc 32 and impinge on the detector of the unit 38. When the piston has traveled downwardly a sufficient distance for the follower arm to rotate the disc 32 sufficiently to block light from the source from impinging on the photocell detector, the timer is shut off.

The distance between the piston 14 and the shaft 22 and the diameter of the bore 60 (or 62) are chosen so that the timer is actuated during a predetermined downward travel distance of the piston. In one apparatus the distance between the shaft 22 and the piston 14 was such that when the smaller diameter disc 60 was used the timer was actuated over one-quarter inch of piston travel. Use of the larger diameter bore 62 caused the timer to be actuated during one inch of piston travel.

The standard melt index determination, as mentioned previously, measures the weight of material passing through the barrel orifice in a given length of time. Because the downward movement of the piston 14 displaces a uniform amount of material through the barrel orifice per unit of movement, the melt index can be determined by measuring the amount of time required for a specific downward movement of the piston. Thus, assuming the melt index of a particular material is to be determined using the previously mentioned standard test, but with the apparatus of this invention, melt index may be calculated as a direct function of time for the piston to travel a predetermined distance. It is assumed that the temperature of the barrel assembly will be controlled as in the usual test procedure.

What is claimed is:

1. In apparatus for determining the melt index of a plastic material wherein the heated plastic material in a barrel assembly is forced through an orifice by the movement of a weighted piston into said barrel assembly, the improvement comprising means contacting said piston for automatically measuring the time taken by said piston to move a predetermined distance into said barrel assembly, said means contacting said piston including a rotatable follower arm contacting said piston, said follower arm having an apertured plate-like element coupled thereto, spaced apart light source and light detector means operatively positioned with respect to said apertured apertured plate-like element, and timing means coupled to said light detector means whereby the elapsed time light is detected through said light coupling element is displayed.

2. Apparatus in accordance with claim 1, wherein said light source means and said light detector means are on opposite sides of said apertured plate-like element.

3. Apparatus in accordance with claim 1, wherein said apertured plate-like element is coupled to said follower arm by friction coupling means.

4. Apparatus in accordance with claim 1, wherein means are provided for weight loading said follower arm.

5. Apparatus in accordance with claim 1, wherein said plate-like element has apertures of various diameters disposed in an array.

* * * * *